United States Patent
MacDonald

(10) Patent No.: US 7,924,727 B2
(45) Date of Patent: Apr. 12, 2011

(54) METHOD FOR WIRELESS NETWORK SELF-CONFIGURATION

(75) Inventor: Daniel John MacDonald, Ottawa (CA)

(73) Assignee: Avaya Holdings Limited, Basking Ridge, NJ (US)

( * ) Notice: Subject to any disclaimer, the term of this patent is extended or adjusted under 35 U.S.C. 154(b) by 1095 days.

(21) Appl. No.: 11/318,063

(22) Filed: Dec. 23, 2005

(65) Prior Publication Data
US 2007/0109972 A1 May 17, 2007

Related U.S. Application Data

(60) Provisional application No. 60/736,899, filed on Nov. 15, 2005.

(51) Int. Cl.
*H04J 1/16* (2006.01)
*H04L 12/26* (2006.01)
(52) U.S. Cl. .................................................. 370/238
(58) Field of Classification Search .................. None
See application file for complete search history.

(56) References Cited

U.S. PATENT DOCUMENTS

| | | | | |
|---|---|---|---|---|
| 6,952,396 | B1 * | 10/2005 | Cottreau et al. | 370/222 |
| 6,956,821 | B2 * | 10/2005 | Szviatovszki et al. | 370/237 |
| 2005/0149615 | A1 * | 7/2005 | Nedimyer et al. | 709/202 |

OTHER PUBLICATIONS

"OSPF Design Guide," file:///DI/paws/7039/1_joeh.html, downloaded Aug. 26, 2004, 55 pages, Cisco Systems, Inc., San Jose, CA.

* cited by examiner

*Primary Examiner* — Raj Jain
(74) *Attorney, Agent, or Firm* — Slater & Matsil, L.L.P.

(57) ABSTRACT

Method for wireless communications network self-configuration. A preferred embodiment comprises determining a state for communications links in the communications network, entering a normal operating mode, and periodically repeating. The determining of communications link state creates a set of shortest paths connecting each access point in the communications network to a wired access point. If a change in the communications network is detected, the connectivity of each access point to the wired access point is verified and the method is repeated to create a potentially new set of shortest paths. Automatic configuration is enabled to provide a measure of fault tolerance.

17 Claims, 7 Drawing Sheets

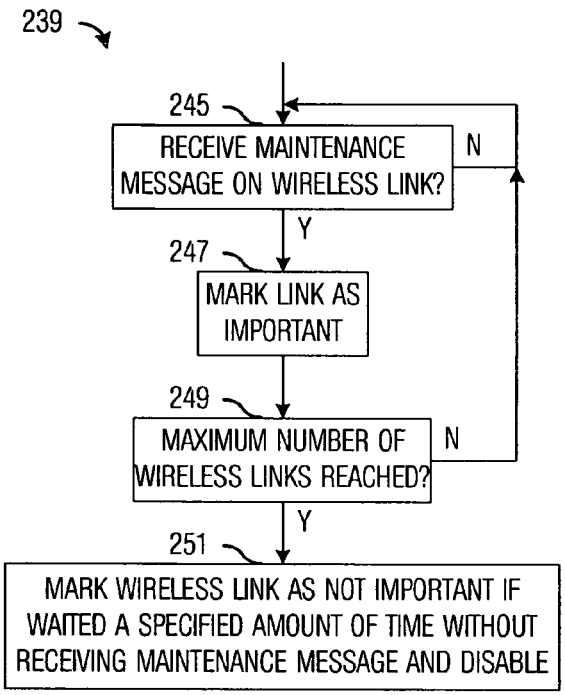
Fig. 2d
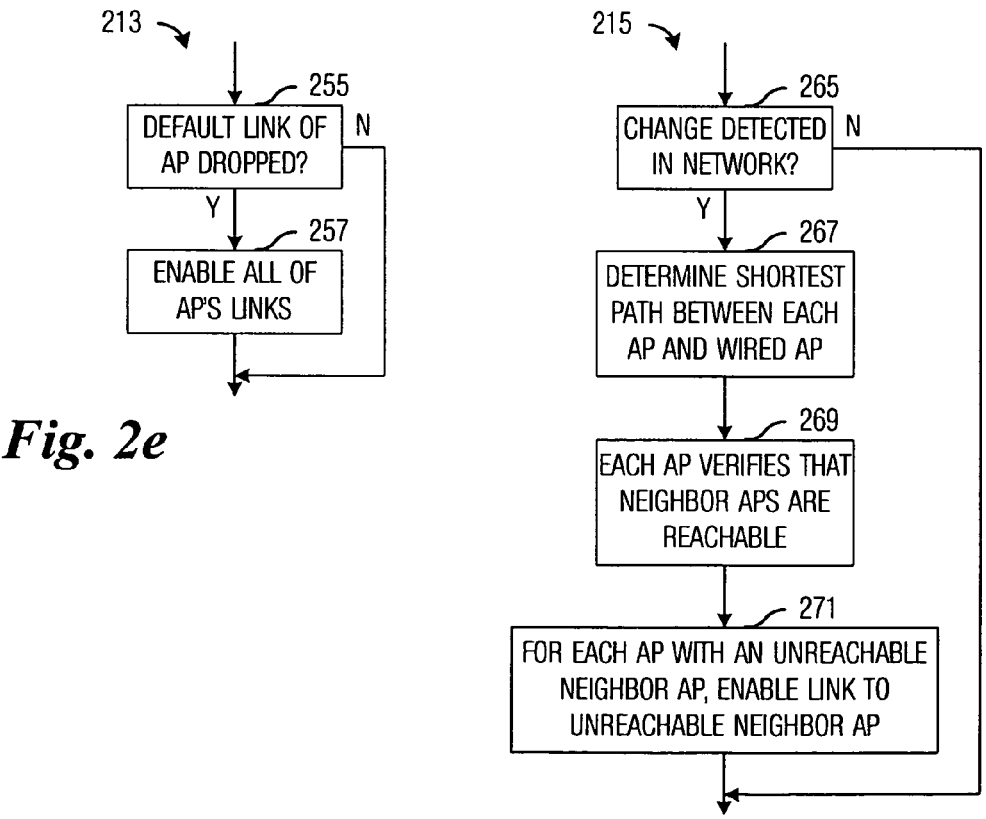
Fig. 2e
Fig. 2f

US 7,924,727 B2

METHOD FOR WIRELESS NETWORK SELF-CONFIGURATION

This application claims the benefit of U.S. Provisional Application No. 60/736,899, filed on Nov. 15, 2005, entitled "Automatic Configuration of Wireless Mesh Networks," which application is hereby incorporated herein by reference.

TECHNICAL FIELD

The present invention relates generally to a method for wireless communications, and more particularly to a method for wireless communications network self-configuration.

BACKGROUND

A wireless communications network that transmits using radio frequency (RF) signals is typically a shared medium network, wherein communications nodes within the wireless communications network transmit using a common frequency band. It is possible to implement virtual connections and/or tunnels between communications nodes by restricting transmissions to certain times or frequency sub-bands. The virtual connections and tunnels can be used to logically denote wireless transmission links between communications nodes.

In a wireless mesh network, for example, communications nodes can transmit to adjacent nodes using wireless transmissions links. Transmissions, however, are limited to flowing either from a communications node to a nearest wired communications node or from the nearest wired communications node to a communications node (for example, a wired communications node may be connected to an information server, a multimedia source/sink, the Internet, and so forth) and not between communications nodes. The communications nodes are wireless routers and operate to provide connectivity between mobile units connected to the wireless mesh network and the wired communications node. The transmissions would flow over wireless links that takes the transmissions closer to their intended destination. For example, if a wireless mesh network has three communications nodes (a first node, a second node, and a wired communications node), then if the first node desires to transmit to the second node, the first node would need to transmit to the wired communications node and then the wired communications node would transmit to the second node.

A technique to enforce the restriction on the communications flow is to assign time slots for all of the wireless links from a communications node. The time slots can also enable a single radio to be used for all wireless links (or the use of fewer radios than a number of wireless links), which can reduce costs by reducing the number of radios in the communications node. For example, if a communications node has four neighboring communications nodes, then four time slots can be used, with one time slot assigned to each of four wireless links. Therefore, if the communications node wants to transmit to one of the four neighboring communications nodes, then it must wait until the assigned time slot to transmit.

A prior art technique that has been used to assign time slots to wireless links is to manually configure each communications node in the wireless mesh network. A network designer would specify available wireless links for each communications node and assign a time slot for each. If the communications node has more wireless links than assigned time slots, these wireless links can be disabled. Once disabled, the wireless links cannot become active.

One disadvantage of the prior art is that the manual configuration of the wireless mesh network can be a time consuming task, especially when there is a large number of communications nodes in the wireless mesh network. Furthermore, as the number of communications nodes increases, the probability of error increases. Errors in enabling/disabling wireless links may leave portions of the wireless mesh network disconnected.

Another disadvantage of the prior art is that the manual configuration of the wireless mesh network is not dynamic. Therefore, if a wireless link (or a communications node) becomes faulty, portions of the wireless mesh network can become disconnected. Since the configuration must be performed manually, the disconnected portion of the wireless mesh network cannot rejoin the remainder of the wireless mesh network until a designer is informed and reconfigures the network.

A further disadvantage of the prior art is that the manual configuration of the wireless mesh network may not yield optimum network performance. This may lead to unintended bottlenecks that can hurt the overall performance of the wireless mesh network.

SUMMARY OF THE INVENTION

These and other problems are generally solved or circumvented, and technical advantages are generally achieved, by preferred embodiments of the present invention which provides a method for wireless network self-configuration.

In accordance with a preferred embodiment of the present invention, a method for configuring a communications network is provided. The method includes determining the state of communications links throughout the communications network, operating in a normal operating mode, and repeating the determining and operating periodically. The determining of the communications link state includes at each access point in the communications network, transmitting a message on a default link to a wired access point, marking a state of the default link with a first hierarchical indicator, marking a state of a communications link with a second hierarchical indicator if a message is received on the communications link, and disabling communications links with states not marked with either the first hierarchical indicator or the second hierarchical indicator. The first hierarchical indicator and the second hierarchical indicator represent a rating of a communications link in a hierarchical scale and a default link is a communications link that is part of a shortest path from the access point to the wired access point.

In accordance with another preferred embodiment of the present invention, a method for determining communications link state in a communications network containing more than one access point is provided. The method includes at each access point in the communications network, transmitting a message on a default link to a wired access point, marking a state of the default link with a first hierarchical indicator, marking a state of a communications link with a second hierarchical indicator if a message is received on the communications link, and disabling communications links with states not marked with either the first hierarchical indicator or the second hierarchical indicator. The first hierarchical indicator and the second hierarchical indicator represent a rating of a communications link in a hierarchical scale and a default link is a communications link that is part of a shortest path from the access point to the wired access point.

An advantage of a preferred embodiment of the present invention is that the configuration of the wireless mesh network is performed automatically, therefore, if a change occurs to the wireless mesh network, the configuration can occur without user intervention. Therefore, if a fault occurs and disconnects a portion of the wireless mesh network, the configuration can reconfigure the wireless network and potentially reconnect the disconnected portion, all potentially before a user even notices that a fault has occurred.

A further advantage of a preferred embodiment of the present invention is that the configuration is performed automatically without user intervention. Therefore, the results of the configuration are assured to be optimum and without mistakes. The optimum configuration of the wireless mesh network can minimize a number of active wireless communications links per communications node. This can minimize the number of time slots required and therefore potentially improve overall network performance.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIGS. 2a through 2f are diagrams of an algorithm for automatically configuring a wireless mesh network, according to a preferred embodiment of the present invention.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a wireless mesh network, wherein communications are limited to flowing either to or from a wired communications node in a shortest path possible fashion. The invention may also be applied, however, to other communications networks wherein there is a desire to optimize paths taken by transmissions to minimize communications costs (measured by a number of transmissions hops, for example) or to avoid routing loops. Additionally, the invention can be applicable to communications networks with a desire for dynamic fault tolerance.

Figure 1A:
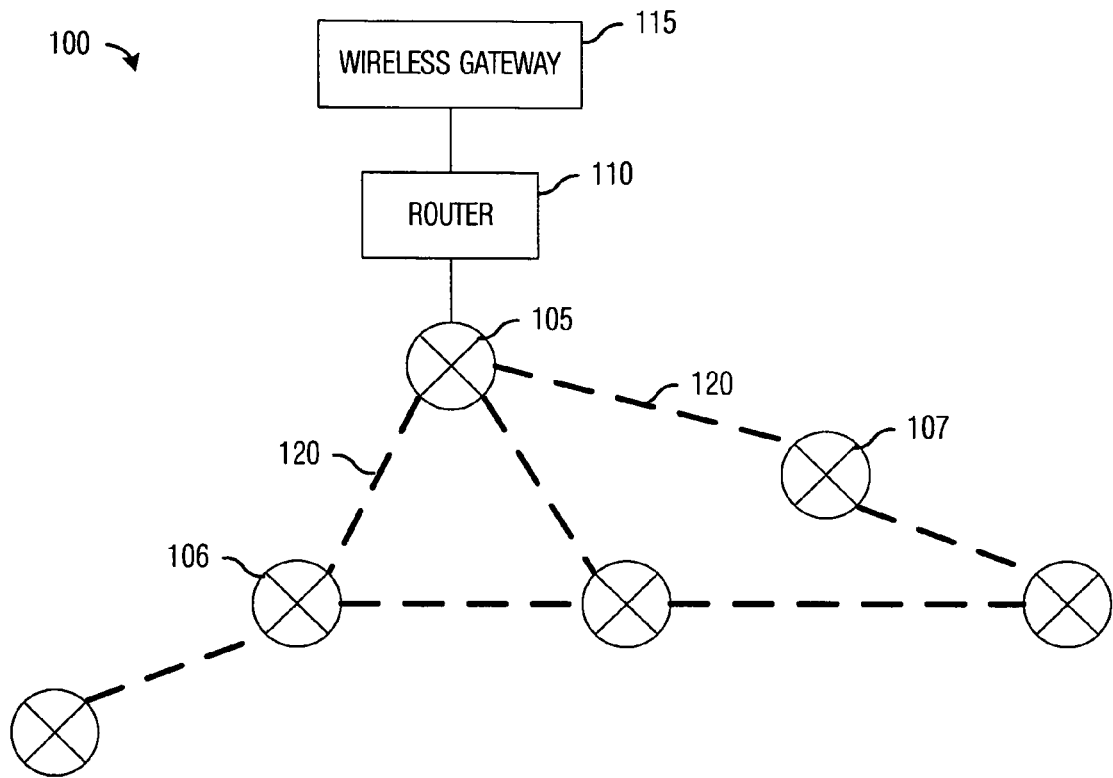
FIGS. 1a and 1b are diagrams of an exemplary wireless mesh network and the exemplary wireless mesh network with an implementation of wireless links.

With reference now to FIG. 1a, there is shown diagram illustrating an exemplary wireless mesh network 100. The wireless mesh network 100 includes multiple access points (AP), such as a wired AP 105, AP 106, and AP 107. A wired AP can also be referred to as an AP at network access point (AP@NAP). The wired AP 105 may be a special AP that can be coupled to a router 110 and a wireless gateway 115. The wired AP 105 can be connected via the router 110 and the wireless gateway 115 to other communications networks, an information server, a multimedia server, the Internet, and so forth. There can be more than one wired AP in the wireless mesh network 100.

An AP, such as the AP 106 or the AP 107, may be wirelessly coupled to the wired AP 105 and to each other via wireless links, such as wireless links 120. The wireless links 120 can be thought of as a virtual connection that can be logically created over a shared medium wireless connection and connects two APs. A wireless link can connect two APs or two wired APs or one AP and one wired AP. A wireless link can be logically created over a shared medium wireless connection by restricting transmission times for specific wireless links. For example, a first wireless link can be constricted to permit transmission only during a first time period and a second wireless link can allow transmissions only during a second time period, and so on. A detailed discussion of an implementation of wireless links over a shared medium wireless connection is provided below.

In the wireless mesh network 100, transmissions can only occur between an AP, for example, the AP 106, and the wired AP 105. The transmission can initiate at either the AP 106 or the wired AP 105. Additionally, a path that the transmission takes through the wireless mesh network must take the transmission closer to the destination. Therefore, if a transmission from the AP 106 to the AP 107 is desired, then two separate transmissions must take place, a first transmission from the AP 106 to the wired AP 105 and a second transmission from the wired AP 105 to the AP 107.

Figure 1B:
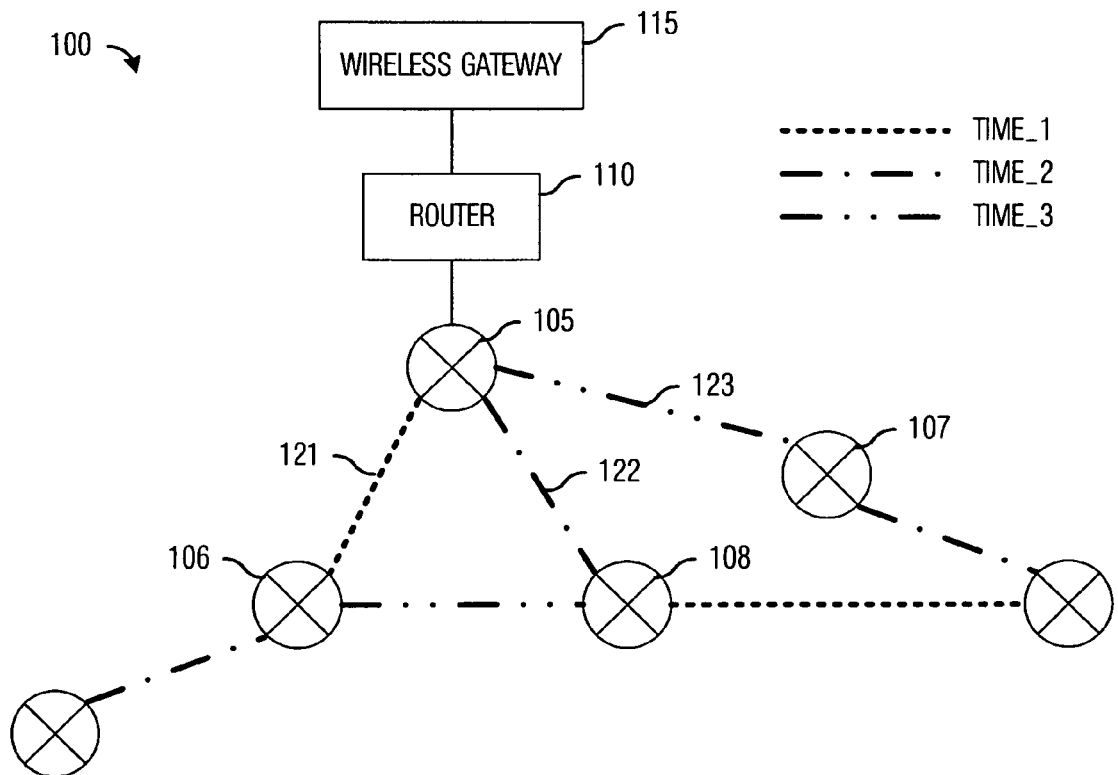

With reference now to FIG. 1b, there is shown a diagram illustrating an implementation of wireless links over the wireless mesh network 100. In a typical wireless mesh network, transmissions are made over a frequency band that is shared by all APs in the wireless mesh network. Therefore, transmissions must be coordinated so that collisions do not negatively affect performance. One way to coordinate transmissions, as well as implement wireless links over the shared wireless medium, is to divide the available transmission time into multiple time slots and assign individual wireless links to different time slots. For example, if each AP can have a maximum of three (3) wireless links, then the available transmission time can be divided into three time slots and each wireless link can be assigned to a time slot.

The wired AP 105, for example, has three wireless links, wireless link 121 to AP 106, wireless link 122 to AP 108, and wireless link 123 to AP 107. A transmission on the wireless link 121 can take place in time slot 1 "TIME_1," while transmissions on the wireless link 122 and the wireless link 123 can take place in time slot 2 "TIME_2" and time slot 3 "TIME_3," respectively. If there is more information to be transmitted than can be transmitted during a single time slot, it will be necessary to stop the transmission once the time slot expires and then resume the transmission once the time slot becomes active once again. For example, if the wired AP 105 wishes to transmit to the AP 106, it can transmit during time slot 1 "TIME_1" and not transmit during time slot 2 "TIME_2" and time slot 3 "TIME_3" and then resume transmitting during time slot 1 "TIME_1."

As the number of wireless links per AP increases, the number of time slots must also increase. However, increasing the number of time slots will reduce the amount of available bandwidth assigned to each wireless link as well as increase the wait time between successive time slots for a wireless link. This can lead to an increase in end-to-end delay as the number of time slots increases. Therefore, it is desirable to minimize the number of wireless links supported per AP while providing a desired level of performance. Since in a wireless mesh network, transmissions must traverse a path that takes the transmission closer to the destination, at any given time, there is only one such path in the wireless mesh network. In order to support fault tolerance, an AP should be able to support additional wireless links that can be activated to provide an alternate shortest path if a wireless link (or AP) that is being used becomes faulty.

As discussed previously, the configuration of existing wireless mesh networks has been a manual task. Manual configuration of a large network can be a tedious and error-prone proposition. Furthermore, manual configuration does not lend itself to fault tolerance since once a fault is detected, a network administrator must be notified to reconfigure the wireless mesh network. Therefore, there is a need for an automated configuration method for the wireless mesh network.

In a wireless mesh network, all transmissions must traverse the wireless links toward their destination. A graph of the wireless links that are part of a shortest path between the APs and the wired AP form a spanning tree with the wired AP at its vertex. Spanning trees are considered to be well understood by those of ordinary skill in the art of the present invention and will not be discussed further herein. The wireless links that are not part of the spanning tree are wireless links of the wireless mesh network that are not part of a shortest path between the APs and the wired AP and drain resources (by requiring time slots, for example). Although the discussion focuses on wireless mesh networks, the present invention has applicability for other forms of communications networks wherein there is a desire to create an efficient set of minimum length paths between communications nodes in the communications network as well as providing a level of fault tolerance.

Figure 2A:
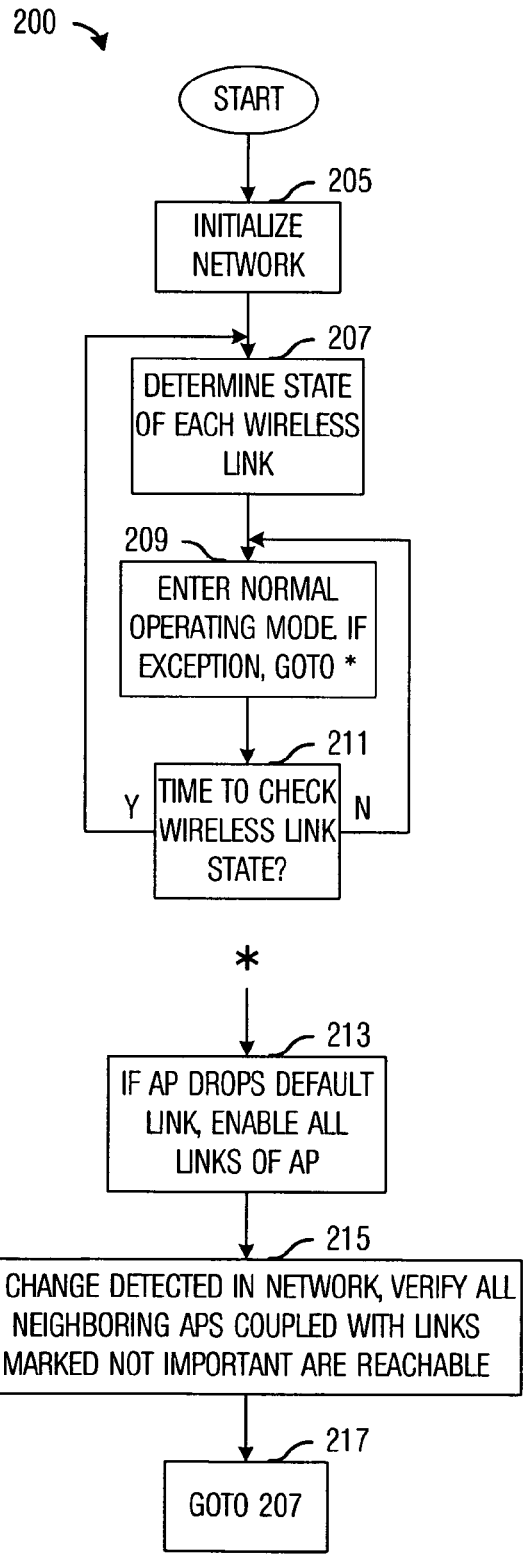

With reference now to FIG. 2a, there is shown a diagram illustrating a high-level view of an algorithm 200 for automatically configuring a wireless mesh network, according to a preferred embodiment of the present invention. The algorithm 200 can execute on individual APs and wired APs in the wireless mesh network. The algorithm 200 can be implemented in the firmware or software of the APs and wired APs and can be configured to initiate when the wireless mesh network is powered on or after it has been reset or restarted. Once the algorithm 200 has been initiated, it can remain executing in the background to provide the ability to reconfigure the wireless mesh network in the event of a failure or fault as well as to optimize network performance in a potentially changing operating environment.

An AP (or a wired AP) executing the algorithm 200 can begin executing, for example, in an AP, with an initialization of the wireless mesh network (block 205). The initialization of the wireless mesh network can comprise a self-test procedure to verify the proper operation of hardware and software in the AP (or the wired AP) as well as other components of the wireless mesh network, obtaining network addresses, network configuration information, initiating communications with other APs and wired APs, and so forth. Once the wireless mesh network has been initialized, each AP in the wireless mesh network can determine the state of each of its wireless links (block 207).

A determination of the state of each AP's wireless links can be achieved by having each AP in the wireless mesh network transmit a message on a wireless link that will bring the message closer to the wired AP (this is referred to as a default link for the AP), then an AP receiving the transmission will mark the wireless link over which it received the transmission as being active (or 'important'). In general, the default link for an AP can be defined as a next hop interface towards the wired AP and can be determined by a routing protocol. The default link for an AP is part of a shortest path between the AP and the wired AP. Additionally, there is only one default link per AP. The default link of an AP is also marked as being active. According to a preferred embodiment of the present invention, the determination of the state of the wireless links can be performed periodically, for example, once every five seconds. The frequency of the determination can be set as a trade-off in overhead spent in performing the determination versus the ability to rapidly detect changes and faults in the wireless mesh network and to reconfigure the wireless mesh network to the changes.

If an AP does not receive a message over a wireless link for a certain amount of time, for example, 30 seconds, it can then mark the wireless link as inactive (or unimportant). Inactive wireless links can be disabled (or put to sleep) and not used to send or receive transmissions. The disabled wireless links then do not require a time slot over which to transmit or receive messages. A more detailed description of the determination of wireless link state is provided below.

In between the periodic determinations of the wireless link state, the wireless mesh network can support normal information traffic between the APs and the wired APs (block 209). A normal operating mode for the wireless mesh network may include transmitting messages from (to) an AP to (from) a wired AP. While in a normal operating mode, it is possible that an exception can occur. An exception can be an unexpected event occurring in the wireless mesh network. A first exception can be if an AP drops its default link and a second exception can be if a change is detected in the wireless mesh network. If it is detected that an AP drops the default link, then all wireless links of the AP are marked as active, even the ones that have previously been disabled (block 213). The AP may drop the default link due to hardware failure, the path of the default link can be temporarily (or permanently) obstructed, and so on. If it is detected that a change has occurred in the wireless mesh network, then a verification that all neighboring APs in the wireless mesh network that are coupled via wireless links that have been disabled (after having been marked as not important), are reachable (accessible) is performed (block 215). After the detection of an exception, a determination of wireless link state can be initiated (block 217). A detailed description of the exception handing is provided below. If no exceptions are detected, then a check can be made to determine if it is time to repeat the determination of wireless link state (block 211). The execution of the algorithm 200 in the APs and the wired APs can continue until the wireless mesh network is powered down or reset.

Figure 2B:
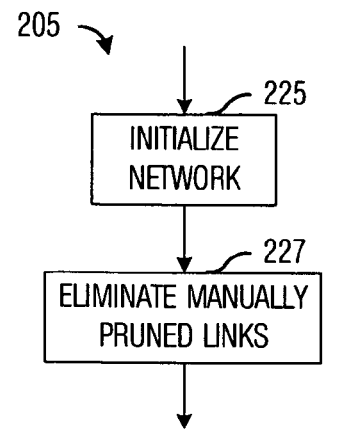

With reference now to FIG. 2b, there is shown a diagram illustrating a detailed view of an exemplary initialization of the wireless mesh network, according to a preferred embodiment of the present invention. The diagram shown in FIG. 2b may be an implementation of block 205 (FIG. 2a). The initialization of the network may include self-test procedures to verify the proper operation of hardware and software in the wireless mesh network, obtaining network addresses and other information, network configuration, initiating communications between APs and wired APs, and so forth (block 225). The initiation may also include the elimination (pruning) of wireless links (block 227). The elimination of wireless links may be accomplished by obtaining a list of wireless links for each AP that is to be eliminated from the wireless mesh network. The wireless links in the list can be permanently disabled and cannot be used in the wireless mesh network, even if there are faults in the wireless mesh network that may require their use. The list is typically unique for each AP and can be stored at each AP. The list can be a way for a designer of the wireless mesh network to limit the number of wireless links in the wireless mesh network to simplify the configuration of the wireless mesh network, for example.

Figure 2C:
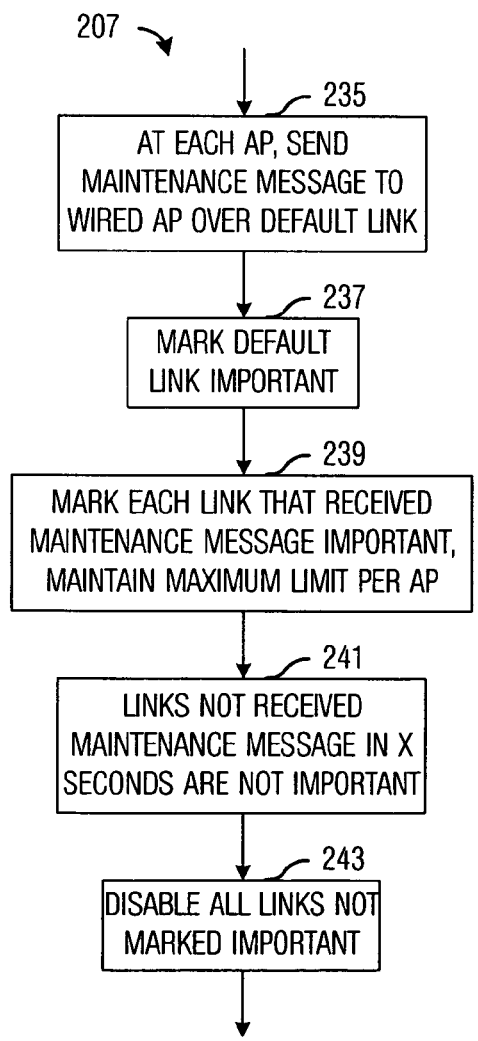

With reference now to FIG. 2c, there is shown a diagram illustrating a detailed view of an exemplary determination of wireless link state, according to a preferred embodiment of the present invention. The diagram shown in FIG. 2c may be an implementation of block 207 (FIG. 2a). At each AP in the wireless mesh network, the AP can send a maintenance message to the wired AP over a default link (block 235). As discussed previously, the default link is the wireless link from the AP that takes the maintenance message to the wired AP (if the AP is a neighbor of the wired AP) or closer to the wired AP (if the AP is not a neighbor of the wired AP). According to a preferred embodiment of the present invention, the maintenance message can be a modified HELLO message of the open shortest path first (OSPF) routing protocol. A HELLO message transmitted on the active wireless links can be modified to identify it as a maintenance message. The HELLO message and the OSPF routing protocol are discussed in greater detail in a document entitled "OSPF Design Guide," published 1992-2005 by Cisco Systems, which is herein incorporated by reference.

After the transmitting the maintenance message, the default link can be marked as active (important) (block 237). Each AP in the wireless mesh network can then wait for the arrival of similar maintenance messages from other APs in the wireless mesh network. If an AP receives a maintenance message over one of its wireless links, the AP can mark the wireless link as active (important) (block 239). During a specification of the wireless mesh network, a limit can be set on the maximum number of active wireless links per AP. If such a limit is set, then as the wireless links are created, a count of the number of created wireless links can be maintained and if this number is reached, then new wireless links are not created. As wireless links are removed due to problems (faults, for example) or due to actions such as those described in these specifications, new wireless links can be added as long as the count of the number of created wireless links does not exceed the configured maximum.

With reference now to FIG. 2d, there is shown a diagram illustrating a detailed view of the marking of active links for an AP, according to a preferred embodiment of the present invention. The diagram shown in FIG. 2d may be an implementation of block 239 (FIG. 2c). Since the number of time slots per AP can be limited in order to achieve a desired performance level, the AP may be able to support more wireless links than the number of time slots. The number of time slots per AP is also equal to a maximum number of wireless links. Therefore, situations may arise when there are potentially more active wireless links than permitted. For example, an AP may be able to support 10 wireless links, and out of the 10 wireless links, five of them may carry maintenance messages, but the AP may be limited to only supporting three. In such a situation, an AP will be able to only mark three wireless links as important and any remaining wireless links will be disabled.

Since the AP is configured to support a maximum number of wireless links at a time, when the marking of wireless link state is initiated, the AP can only configure as many wireless links as the maximum number of wireless links and then only check those wireless links for maintenance messages. When an AP receives a maintenance message on a wireless link (block 245), the AP will mark the wireless link as being active (important) (block 247). After marking the wireless link as active, the AP can perform tasks such as assigning a time slot to the newly marked wireless link. Additionally, the AP can determine if it has already reached a maximum number of wireless links that it is allowed to support (block 249). If the AP has not marked as many wireless links important as the maximum number of wireless links, then it can wait for more maintenance messages. If the AP has waited a specified amount of time and no more maintenance messages have arrived, then the AP can mark any wireless links that it has configured as being not important and disable them (block 251). If a wireless link is marked not important and disabled, then a previously unchecked wireless link can be configured by the AP and the AP can listen for maintenance messages on the newly configured wireless link. However, if the AP has marked as important a number of wireless links equal to the maximum number of wireless links, then the AP is complete in marking wireless link state.

Since the determination of wireless link state occurs periodically during the operation of the wireless mesh network, it is possible for a wireless link that has been marked active to later become inactive. If this is the case, then the AP now has a free time slot. The AP can make use of the newly freed time slot to check if one of the wireless links marked inactive is actually an active link. For each iteration of the determination of wireless link state, the wireless mesh network can become closer to an optimum configuration.

With reference back to FIG. 2c, wireless links that did not receive a maintenance message in more than a specified amount of time (for example, X seconds) are marked as inactive (not important or unimportant) (block 241). After having marked all wireless links of each AP as either active (important) or inactive (not important or unimportant), each AP can disable all wireless links that are marked as inactive (block 243). A wireless link that has been disabled is effectively removed from the wireless mesh network and is not used to transmit any information nor are any time slots assigned to the disabled wireless links. Therefore, the disabled wireless links do not exist in the wireless mesh network, at least until they are needed to provide fault tolerance.

It is possible to rapidly recover (wake up) a disabled link at the expense of overhead and processing resources. With a variable time slot scheduler, a formerly disabled link can be enabled in a time that is on the order of the amount of time required to schedule a time slot. This can be achieved by dedicating a time slot to a disabled link, but not allocating any actual transmission time to the disabled link. Necessary overhead is devoted to the disabled link but very little actual transmission time. Therefore, to enable a wireless link, it is only necessary to schedule more transmission time for the wireless link and not need to actually perform all of the necessary tasks for creating a new link. For example, in an AP with three active links and one disabled link, four time slots can be allocated. The three active links will be assigned time slots with actual transmission times while the disabled link will be assigned a time slot with zero transmission time. Without a variable time slot scheduler, a formerly disabled link can be enabled only after the time slot structure of the AP is adjusted to make room for the disabled link as well as propagating necessary changes to neighboring APs.

With reference now to FIG. 2e, there is shown a diagram illustrating a detailed view of an exemplary exception handling of a dropped default link, according to a preferred embodiment of the present invention. The diagram shown in FIG. 2e may be an implementation of block 213 (FIG. 2a). Since a transmission routing scheme used in the wireless mesh network the wireless link that takes a transmission closer to the wired AP (referred to as a default link) is a crucial wireless link, if the default link was to become faulty, a replacement wireless link must be found or portions of the wireless mesh network may become disconnected. As soon as a default link of an AP is determined to have been dropped (block 255), all wireless links of the AP are enabled, up to the maximum number of permitted wireless links (block 257). The wireless links that are enabled may include any wireless links of the AP that have been previously marked inactive due to inactivity and subsequently disabled. This may not include wireless links that were specifically eliminated (pruned) during the initiation of the wireless mesh network, such as in block 227 (FIG. 2b). The enabling of the disabled wireless links of the AP produces another exception, a change to the wireless mesh network. The exception handling for changes to the wireless mesh network is discussed in detail below.

With reference now to FIG. 2f, there is shown a diagram illustrating a detailed view of an exemplary exception handling of a change in the wireless mesh network, according to a preferred embodiment of the present invention. The diagram shown in FIG. 2f may be an implementation of block 215 (FIG. 2a). A change in the wireless mesh network may include events such as a wireless link (including a default link) becoming faulty, a wireless link being detected, an AP becoming faulty, an AP being detected, and so forth. When a change occurs to the wireless mesh network, an existing configuration for the wireless mesh network may no longer provide the optimal configuration (at best) or may no longer provide successful transmission routing for all APs with some portions of the wireless mesh network being disconnected (at worst).

After a network change exception is detected (block 265), it may be necessary to execute a procedure to determine shortest paths between each AP and the wired AP in the network (block 267). Depending on routing protocol, the determination of the shortest paths can be performed automatically whenever there is a change detected in the network. According to a preferred embodiment of the present invention, the shortest paths between each AP and the wired AP can be determined by executing a shortest path first (SPF) algorithm that is a part of the OSPF routing protocol. A description of the SPF algorithm can be found in the document entitled "OSPF Design Guide," published 1992-2005 by Cisco Systems.

After the execution of the SPF algorithm, each AP can compare a locally stored and maintained list that contains entries for wireless links that the AP has disabled as well as an identifier for a neighboring AP that was formerly reachable by each wireless link that was disabled, with a routing table created by the execution of the SPF algorithm. For each neighboring AP in the list, if the neighboring AP is not in the routing table, then the neighboring AP is not reachable (block 269). Because the neighboring AP is not reachable and since it is in the list of neighbors decoupled by a wireless link that was disabled by the AP, the AP can correct the situation by enabling the wireless link, again dependent upon a maximum number of permitted wireless links (block 271). Once the wireless link is enabled, the neighboring AP should then be directly reachable and will therefore be included in the routing table.

The above discussion discloses the marking of a state for a wireless link as either important or unimportant and the state of a wireless link can be used to enable or disable a wireless link. However, it is possible to further quantify a state of a wireless link to include a wireless link quality indicator. For example, rather than marking a state of a wireless link as simply important, a hierarchical indicator can be used to indicate that a wireless link is active as well as provide information regarding the wireless link's quality. Measures of a wireless link's quality can include maximum available bandwidth, bit error rate, frame error rate, amount of congestion, wireless link latency, and so forth. The hierarchical indicators can then be used in the selection of wireless links to mark as important or unimportant. For example, if a wireless link of an AP is determined to be active but with a very low maximum available bandwidth, the wireless link may be marked as inactive to permit the enabling of an unimportant or undetermined wireless link that may yield better performance. A number of possible classifications for a wireless link can be dependent upon a desired performance level when compared to an increase in complexity associated with the use of the hierarchical classification.

With reference now to FIGS. 3a through 3j, there are shown diagrams illustrating the automatic configuration of an exemplary wireless mesh network 300, according to a preferred embodiment of the present invention. The FIGS. 3a through 3j illustrate the operation of an automatic configuration algorithm, such as the algorithm 200 (FIG. 2a), as it configures and reconfigures the wireless mesh network 300 as the wireless mesh network 300 changes due to faults and the addition of extra network resources. The wireless mesh network 300 is an exemplary wireless mesh network and the present invention can be applicable to other wireless mesh network configurations as well as other types of communications networks. The discussion of the wireless mesh network 300 should not be construed as limiting to the scope or the spirit of the present invention.

The wireless mesh network 300 is comprised of a wired AP 305 and a plurality of APs, such as AP 306, AP 307, and AP 308. The wired AP 305 can be coupled to a wireless gateway/router 310, which permits connectivity of the wireless mesh network 300 to external networks, such as the Internet, data servers, multimedia servers, and so forth. The wireless gateway/router 310 can implement the functionality of both a router (such as the router 110 (FIG. 1a)) and a wireless gateway (such as the wireless gateway 115 (FIG. 1a)) in a single unit.

Figure 3A:
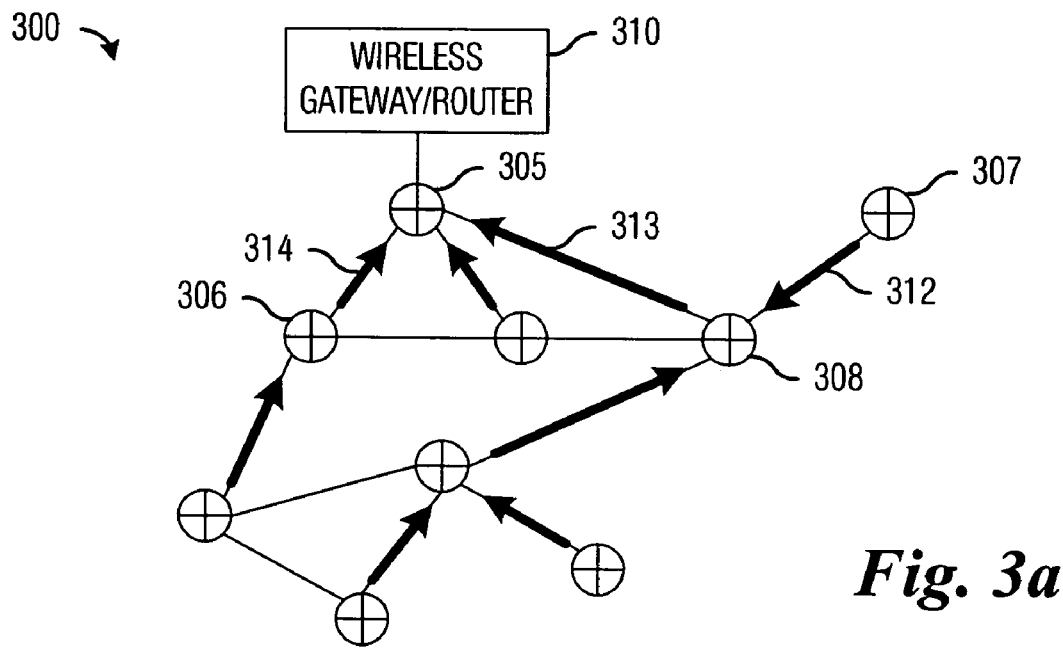
FIGS. 3a through 3j are diagrams of the automatic configuration of an exemplary wireless mesh network, according to a preferred embodiment of the present invention.

Although each AP may have more than one wireless link connected to other APs in the wireless mesh network 300, only one wireless link per AP is designated the default link. Each AP can transmit a maintenance message (for example, a modified OSPF HELLO message) over the default link. As shown in FIG. 3a, the maintenance messages are illustrated as heavy arrows, such as arrow 312 from the AP 307 to the AP 308, arrow 313 from the AP 308 to the wired AP 305, and arrow 314 from the AP 306 to the wired AP 305.

Figure 3B:
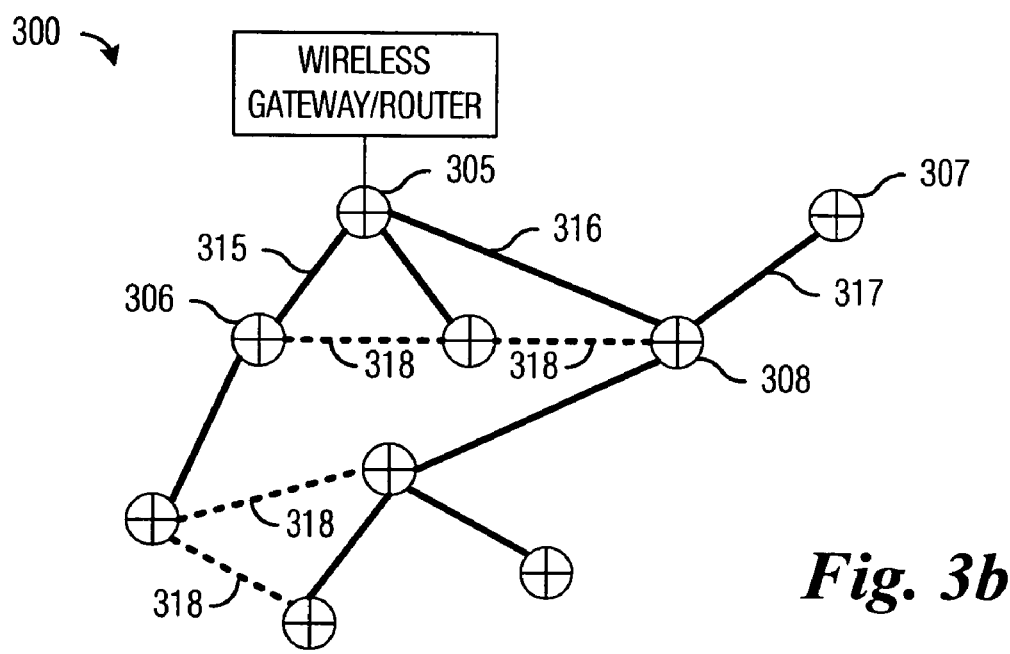

With reference now to FIG. 3b, there is shown a diagram illustrating the wireless mesh network 300 after a determination of wireless link state, according to a preferred embodiment of the present invention. After the maintenance messages are received and all wireless links are marked either active (important) or inactive (not important or unimportant), the inactive wireless links can be disabled. As shown in FIG. 3b, active links (shown as dark solid lines) exist been each AP and the wired AP 305, for example, active link 315 couples the AP 306 to the wired AP 305, active link 316 couples the AP 308 to the wired AP 305, and active link 317 couples the AP 307 to the AP 308. Also shown are wireless links that are in disabled. Disabled wireless links 318 are shown in FIG. 3b as heavy dashed lines.

Figure 3C:
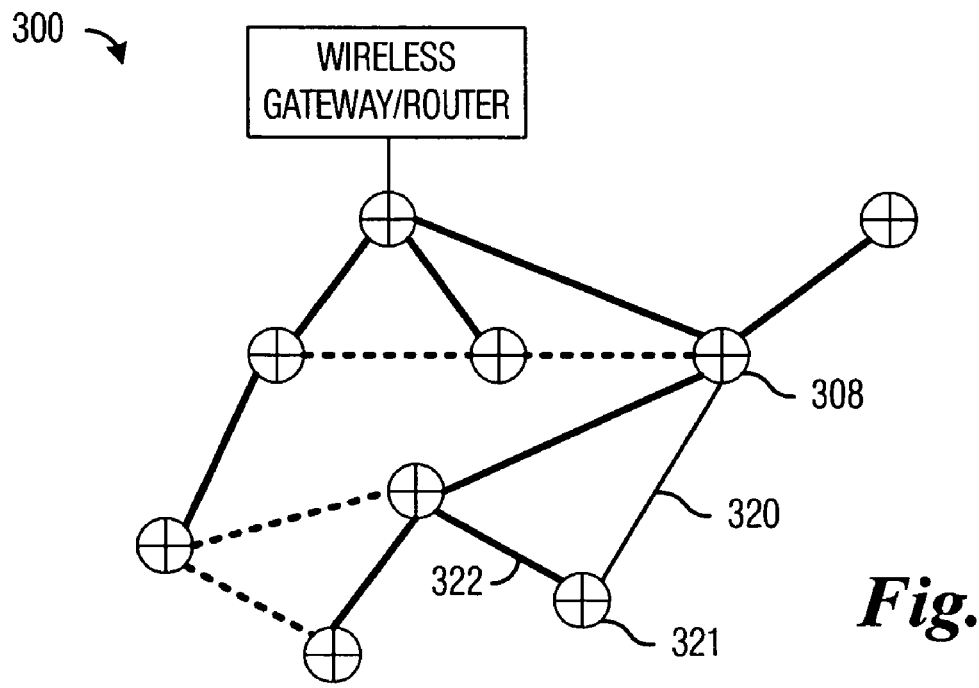

With reference now to FIG. 3c, there is shown a diagram illustrating the detection of a new wireless link in the wireless mesh network 300, according to a preferred embodiment of the present invention. A new wireless link may be detected once the wireless mesh network 300 has commenced operation if, for example, there had been an obstruction between APs connected by the new wireless link. As shown in FIG. 3c, a new wireless link 320 connects an AP 321 to the AP 308. Since the detection of the new wireless link 320 is a change in the network exception, the exception must be processed to help ensure the proper operation of the wireless mesh network 300. The exception can be handled by an exception handler, such as discussed in detail in the discussion of FIG. 2e. For discussion purposes, let the exception handler determine that the new wireless link 320 is a shorter path to the wired AP 305 than wireless link 322, which was a default link of the AP 321.

Figure 3D:
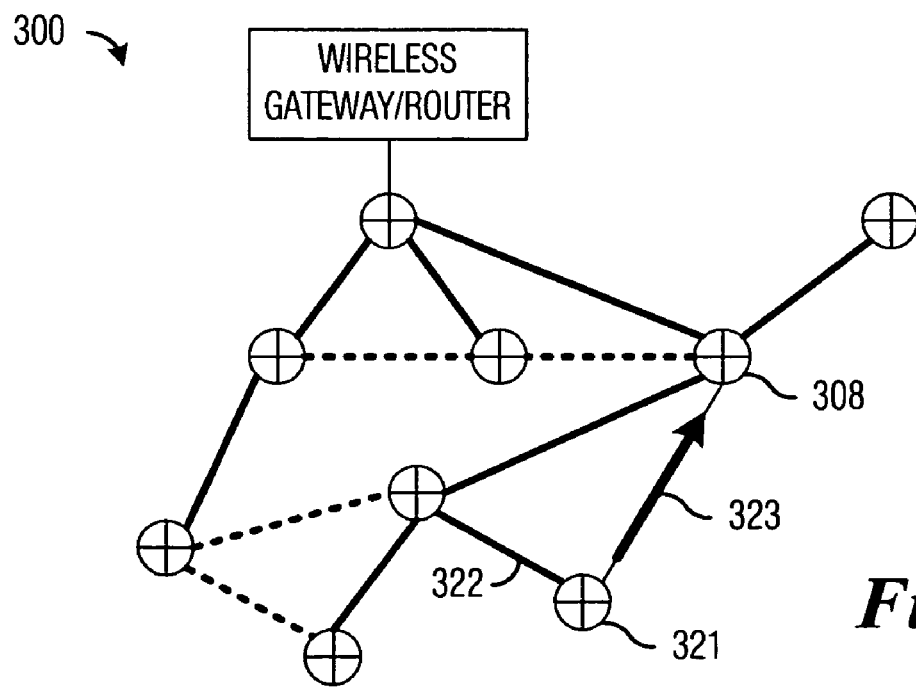

With reference now to FIG. 3d, there is shown a diagram illustrating the determination of wireless link state, according to a preferred embodiment of the present invention. Since the new wireless link 320 has been determined to be a shorter path to the wired AP from the AP 321, a maintenance message is transmitted over the new wireless link 320 (shown in FIG. 3d as a heavy arrow 323). The AP 308 upon receipt of the maintenance message transmitted over the new wireless link 320 will mark it as an active (important) wireless link. Other APs may have also transmitted maintenance messages over their respective default links. Since their respective portions of the wireless mesh network 300 did not change, the transmissions of the maintenance messages are not shown.

Figure 3E:
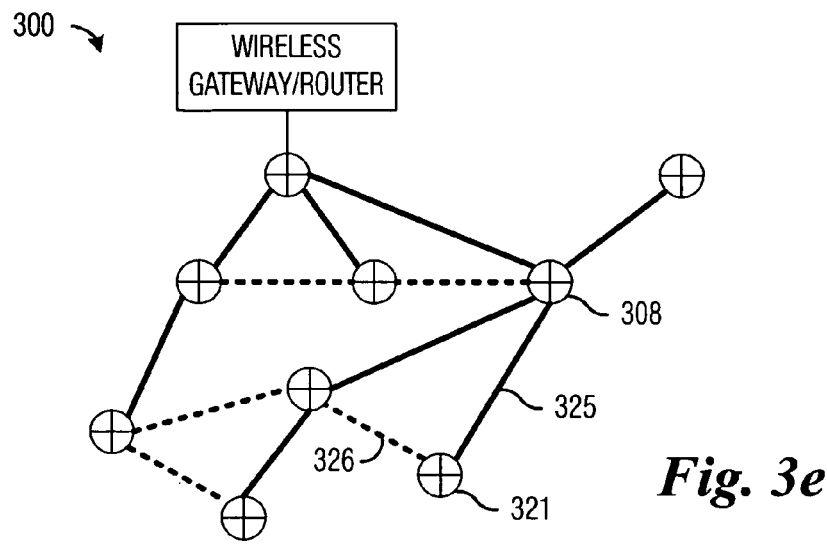

With reference now to FIG. 3e, there is shown a diagram illustrating the wireless mesh network 300 after a determination of wireless link state, according to a preferred embodiment of the present invention. The new wireless link 320 is now the default link of the AP 321 and is shown in FIG. 3e as active link 325. In the meantime, the wireless link 322 (the former default link of the AP 321) no longer carries message traffic and therefore, after a period of time, the wireless link 322 becomes marked inactive and is disabled and is shown in FIG. 3e as heavy dashed line 326.

Figure 3F:
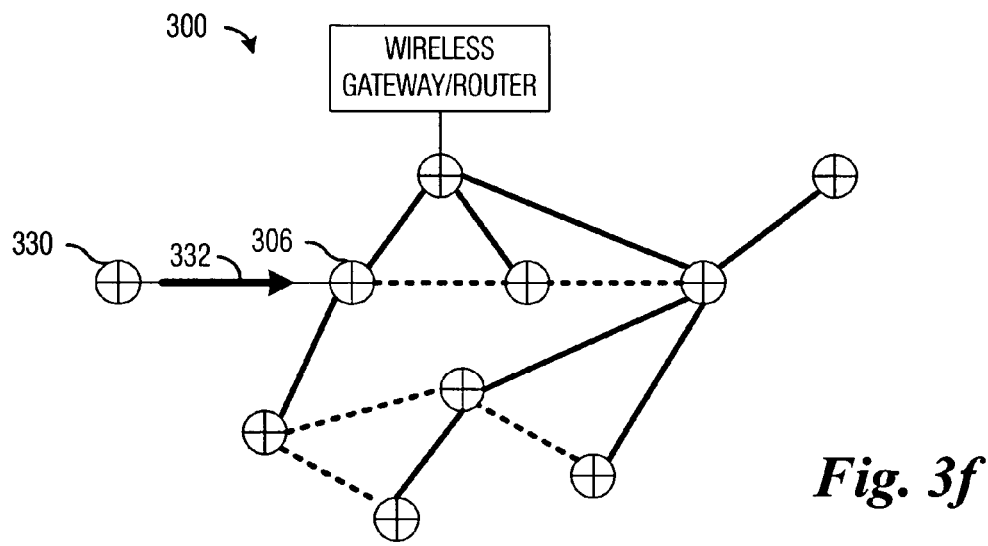
Figure 3G:
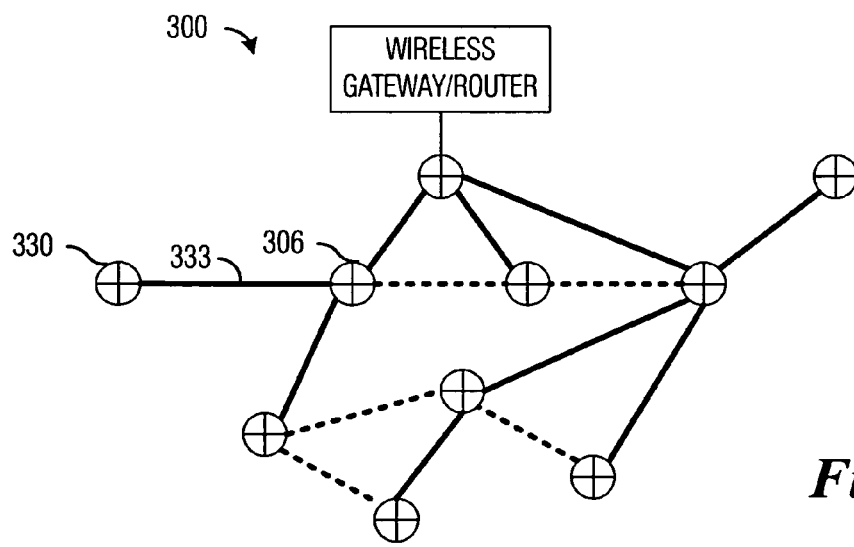

With reference now to FIG. 3f, there is shown a diagram illustrating the detection of a new AP 330 in the wireless mesh network, according to a preferred embodiment of the present invention. The detection of the AP 330 in the wireless mesh network results in a change in the network exception and as a result, a determination of wireless link state is performed. The AP 330 transmits a maintenance message (shown as heavy arrow 332) on its default link. The diagram shown in FIG. 3g illustrates the results of the determination of wireless link state, with an active link 333 coupling the AP 330 and the AP 306. Other APs may have also transmitted maintenance messages over their respective default links. Since their respective portions of the wireless mesh network 300 did not change, the transmissions of the maintenance messages are not shown.

Figure 3H:
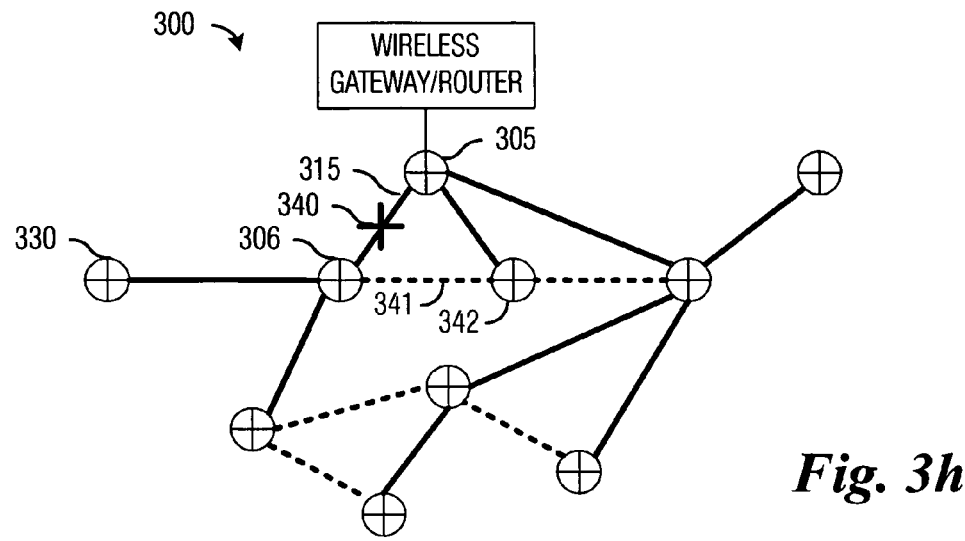

With reference now to FIG. 3h, there is shown a diagram illustrating the wireless mesh network 300 after the detection of a faulty wireless link, according to a preferred embodiment of the present invention. A fault on the active link 315 (shown as a cross 340) can disconnect portions of the wireless mesh network 300. For example, as shown in FIG. 3h, the fault on the active link 315 can disconnect the AP 306, as well as the AP 330 and other APs not specifically referenced, from the wired AP 305. The detection of the faulty active link 315 is a dropped default link exception (the faulty active link 315 is the default link of the AP 306) and can be handled by an exception handler, such as discussed in detail in FIG. 2d.

Figure 3I:
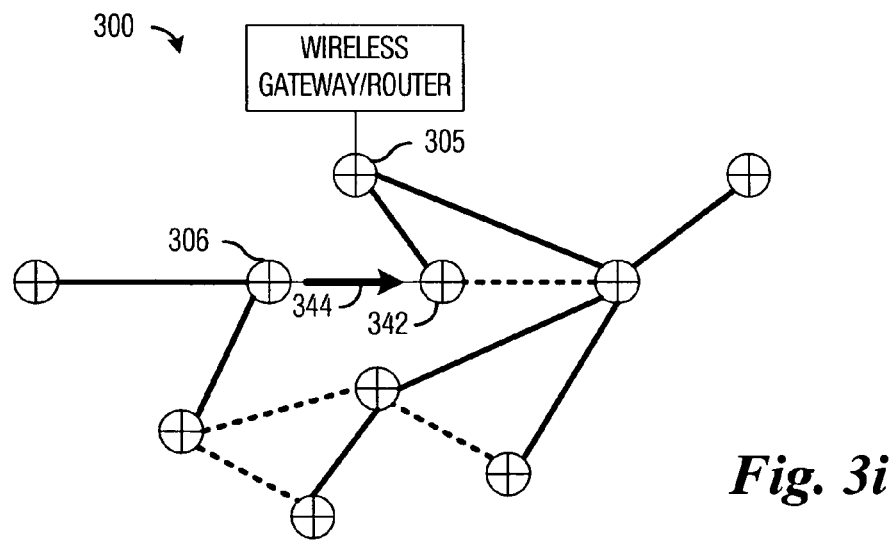

The exception handler enables all wireless links of the AP 306, including a disabled link 341, which couples the AP 306 to AP 342. The enabling of the disabled link 341 results in a change in the network exception that will initiate a determination of shortest paths between APs and the wired AP 305. The determination of shortest paths determines that the disabled link 341 is part of the shortest path between the AP 306 and the wired AP 305. The fault on the active link 315 is also a change in the network exception, which will initiate a determination of wireless link state. The diagram shown in FIG. 3i illustrates the determination of wireless link state, wherein a maintenance message is transmitted by the AP 306 (shown as heavy arrow 344). Other APs may have also transmitted maintenance messages over their respective default links. Since their respective portions of the wireless mesh network 300 did not change, the transmissions of the maintenance messages are not shown.

Figure 3J:
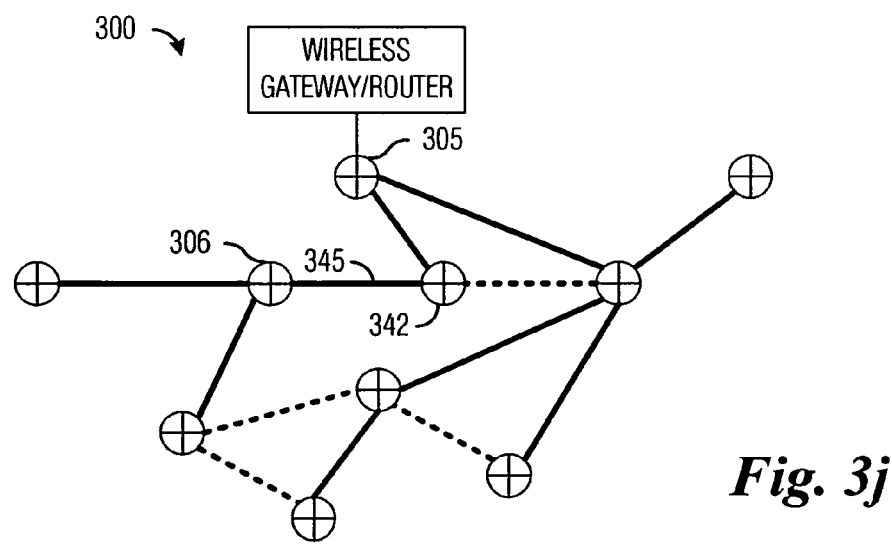

With reference now to FIG. 3j, there is shown a diagram illustrating the wireless mesh network 300 after the detection and handling of a fault on a default link, according to a preferred embodiment of the present invention. When the AP 342 receives the maintenance message from the AP 306 over a formerly disabled wireless link 341, the AP 342 will mark the formerly disabled wireless link 341 as active (shown in FIG. 3j as active link 345). The wireless mesh network 300 is now once again fully connected with the AP 306 reconnected to the wired AP 305.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for configuring a communications network comprising a plurality of access points, the method comprising:
   determining communications link state in the communications network, wherein the determination of communications link state comprises, at each access point,
   (a) transmitting, by the access point, a message on a default link of the access point to a wired access point, wherein the default link is a communications link that is part of a shortest path from the access point to the wired access point;
   (b) marking, by the access point, a state of the default link with a first hierarchical indicator, wherein the first hierarchical indicator represents a rating of the default link in a hierarchical scale;
   (c) marking a state of one communications link with a second hierarchical indicator in response to a receipt of a message on the one communications link, wherein the second hierarchical indicator represents a rating of the one communications link in the hierarchical scale;

(d) after the marking of said state of said one communications link, marking a state of another communications link with a third hierarchical indicator in response to not receiving a message on the another communications link for a specified period of time, wherein the third hierarchical indicator represents a lower hierarchical value than either the first hierarchical indicator or the second hierarchical indicator; and (e) disabling communications links with states not marked with either the first hierarchical indicator or the second hierarchical indicator;

entering a normal operating mode; and periodically repeating the determining and entering steps.

2. The method of claim 1 further comprising:

enabling all communications links of an access point in the communications network in response to a determination that the access point has a faulty default link; and verifying an accessibility of all access points in the communications network in response to a determination that a change has occurred in the communications network.

3. The method of claim 2, wherein the enabling comprises changing a state of any communications link of the access point to either the first hierarchical indicator or the second hierarchical indicator from the third hierarchical indicator.

4. The method of claim 2, wherein the enabling comprises changing a state of any communications link of the access point from unimportant to important.

5. The method of claim 2, wherein the verifying comprises:

determining a shortest path between each access point and the wired access point; and at each access point,
    verifying that all neighboring access points are accessible, wherein a neighboring access point is an access point that is one communications link away; and
    enabling a neighbor communications link to a disconnected neighboring access point in response to a determination that the disconnected neighboring access point is not accessible.

6. The method of claim 5, wherein neighbor communications link can only transmit during an assigned time slot, and wherein the enabling comprises assigning a time slot to the neighbor communications link being enabled.

7. The method of claim 5, wherein the determining of a shortest path comprises executing a shortest path first algorithm.

8. The method of claim 2 further comprising repeating the determining of communications link state and the entering of a normal operating mode immediately after the verifying.

9. The method of claim 2, wherein the enabling of all communications links and the verifying of accessibility occurs only while the communications network is in the normal operating mode.

10. The method of claim 1 further comprising, prior to the determining of communications link state, initializing the communications network.

11. The method of claim 10, wherein the initializing comprises blocking communications links specified in a list specific to each access point.

12. The method of claim 11, wherein the list for a specific access point is located at the specific access point, and specifies only communications links to be blocked at the specific access point.

13. A method for determining communications link state in a communications network comprising a plurality of access points, the method comprising at each access point in the communications network:

transmitting, by the access point, a maintenance message on a default link of the access point to a wired access point, wherein the default link is a communications link that is part of a shortest path from the access point to the wired access point;

marking, by the access point, a state of the default link with a first hierarchical indicator, wherein the first hierarchical indicator represents a rating of the default link in a hierarchical scale;

marking a state of one communications link with a second hierarchical indicator in response to a receipt of a message on the one communications link, wherein the second hierarchical indicator represents a rating of the one communications link in the hierarchical scale;

marking a state of another communications link with a third hierarchical indicator in response to not receiving a message on the another communications link for a specified period of time, wherein the third hierarchical indicator indicates a lesser quality communications link than either the first hierarchical indictor or the second hierarchical indicator;

disabling any communications links with states marked with the third hierarchical indicator; and periodically repeating the transmitting and marking steps.

14. The method of claim 13, wherein the specified period of time measures an elapsed time from the transmitting.

15. The method of claim 13, wherein the another communications link's state is marked with the third hierarchical indicator in response to not receiving a message for the specified period of time even if it was previously marked with the first hierarchical indicator or the second hierarchical indicator.

16. The method of claim 13, wherein the communications network is a wireless mesh network.

17. A method for determining communications link state in a communications network, wherein the communications network comprises a plurality of access points, wherein each access point has a maximum number of allowed links, the method comprising at each access point in the communications network:

transmitting, by the access point, a message on a default link of the access point to a wired access point, wherein the default link is a communications link that is part of a shortest path from the access point to the wired access point;

marking, by the access point, a state of the default link with a first hierarchical indicator, wherein the first hierarchical indicator represents a rating of the default link in a hierarchical scale; and marking a state of one communications link with a second hierarchical indicator in response to a receipt of a message on the one communications link, wherein the second hierarchical indicator represents a rating of the one communications link in the hierarchical scale;

after the marking of the states of the communications links with the first hierarchical indicator or the second hierarchical indicator, marking the state of all communications links not already marked with the first hierarchical indicator or the second hierarchical indicator with a third hierarchical indicator in response to an elapsing of a specified interval of time;

disabling any communications links with states marked with the third hierarchical indicator; and periodically repeating the transmitting and marking steps.

* * * * *